June 19, 1923.
J. KOENIG ET AL
1,459,289
PERCOLATOR
Filed April 4, 1922
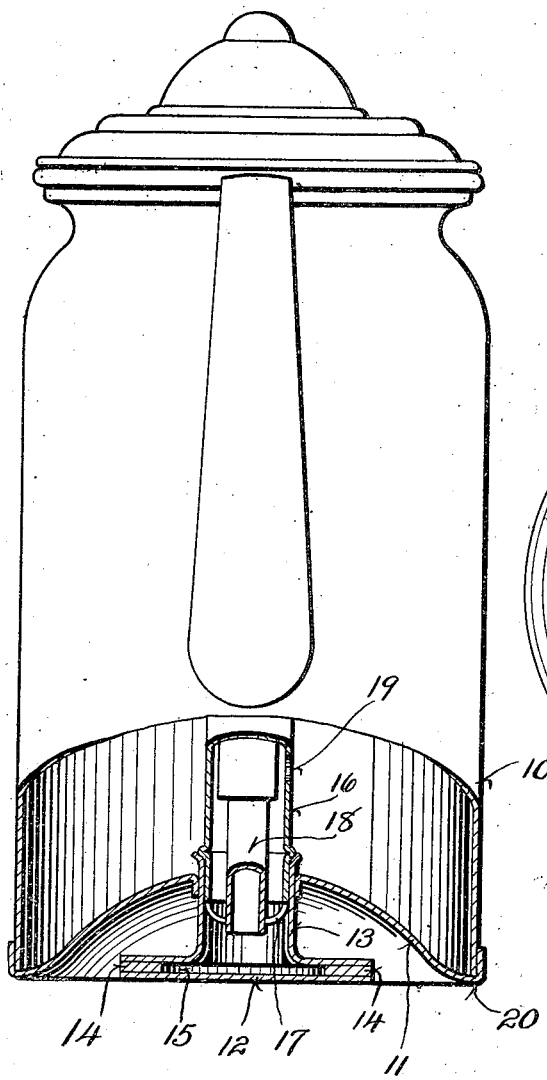
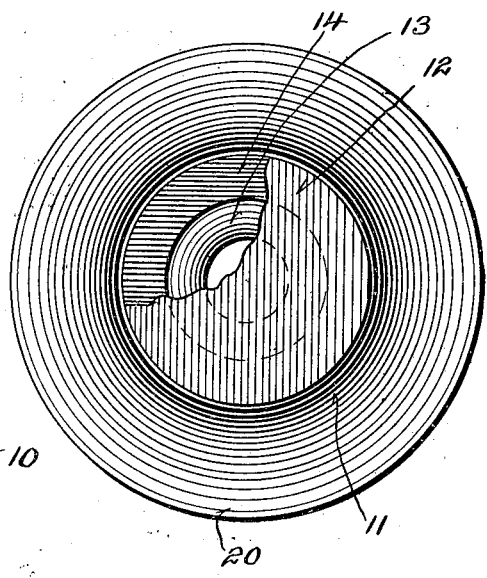
Inventor
Joseph Koenig
Willam H. Ellis Patented June 19, 1923.

1,459,289

UNITED STATES PATENT OFFICE.

JOSEPH KOENIG AND WILLIAM H. ELLIS, OF TWO RIVERS, WISCONSIN.

PERCOLATOR.

Application filed April 4, 1922. Serial No. 549,427.

*To all whom it may concern:*

Be it known that we, JOSEPH KOENIG and WILLIAM H. ELLIS, both citizens of the United States, and residents of Two Rivers, in the county of Manitowoc and State of Wisconsin, have invented certain new and useful Improvements in Percolators; and we do hereby declare that the following is a full, clear, and exact description thereof.

The invention relates to percolators for coffee-pots.

In percolators it is imperative that a large amount of heat be transmitted to a small quantity of liquid in order that an efficient percolating action may result. Hitherto difficulty has been experienced with percolators by reason of the fact that there is an insufficient transmission of heat to the liquid, and, also, by reason of the construction of the bottom of the coffee-pot, which is oftentimes very unstable, creating a tendency to overturn.

The invention comprises a heater having a tubular portion and a wider bottom portion, operative to give a considerable heating and evaporating capacity, and a solid metal flange projecting laterally to assist in the heating action. The center of the bottom of the pot is raised to bring the heater high enough to have the bottom surface thereof on a level with the lowermost outer portion of the pot.

A primary object of the construction is efficient percolating action, the flange serving to convey heat rapidly to the liquid in the heater and the widened lower chamber in the heater exposing the coffee to the action of the heat readily transmitted through the bottom of the heater. The heater tube is narrow so that a very small quantity of liquid is exposed to the action of a large amount of heat. Thus the fluid is rapidly raised to a high temperature and surges upwardly in the inner tube, producing a thorough and effective percolating action.

An object of the construction is the stability of the coffee-pot, the outer portion of the bottom being on the same level as the bottom of the heater, which prevents the tendency of the coffee-pot to overturn and maintains it in proper position, despite such vibration as is developed in said percolating action.

With the above and other objects in view, which will appear as the description proceeds, our invention resides in the novel construction, combination and arrangement of parts, substantially as hereinafter described and more particularly defined by the appended claim, it being understood that such changes in the precise embodiment of the herein disclosed invention may be made as come within the scope of the claim.

In the accompanying drawing, we have illustrated one complete example of the physical embodiment of the present invention constructed according to the best mode we have so far devised for the practical application of the principles thereof, and in which:—

Figure 1 is a central, vertical section through the percolator and heater, showing in side elevation other coffee-pot features.

Figure 2 is a bottom plan view with parts broken away.

The coffee-pot 10 may be of any shape or design, its bottom being raised centrally at 11. The heater comprises a relatively large lower plate 12 and a very narrow tube 13, the parts merging in an annular flange 14 of considerable extent, a chamber 15 being produced of large diameter, but small in vertical dimension, so that heat is transmitted rapidly through plate 12 and flange 14 to the coffee. The small diameter of tube 13 and the small vertical dimension of chamber 15 are such that a small quantity of liquid is exposed to the heating action. Outer tube 16 is in slip-fit connection with tube 13 and has lugs 17 thereon contacting with the lower end of inner tube 18 and spacing the two tubes apart. The liquid is admitted through an opening 19 in outer tube 16 and descending in tube 13 is partially vaporized and propelled rapidly upwardly through inner tube 18. The spacing of the bottom of the coffee-pot upwardly at 11 brings the cold liquid away from tube 13 so that it exerts no cooling influence which would retard the heating action. The outer edge of the bottom 20 is on a level with plate 12 so that an effective rest is provided, maintaining the pot in stable position and eliminating danger of overturning. The heater, comprising plate 12, flange 14, and tube 13, may be of one piece, or welded of several pieces. The tube 13 is preferably attached to the bottom by welding, or any other suitable manner.

We claim:—

In a coffee percolator the combination of a bottom having a raised center, a tube of small diameter rigidly affixed to said center, and an enlarged section at the base of said tube, said bottom having a portion flush with said base, a second tube secured to and extending upwardly from said first mentioned tube and having an opening therein spaced above said first mentioned tube, and a third tube positioned within and spaced from the wall of said second tube and projecting downwardly into said first tube.

In testimony that we claim the foregoing we have hereunto set our hands at Two Rivers, in the county of Manitowoc and State of Wisconsin.

WM. H. ELLIS.
JOSEPH KOENIG.